United States Patent
Hayasaka et al.

(10) Patent No.: US 10,033,237 B2
(45) Date of Patent: Jul. 24, 2018

(54) NEUTRAL RING FOR USE IN ROTATING ELECTRICAL MACHINE AND METHOD FOR MANUFACTURING THE SAME

(71) Applicant: Hitachi, Ltd., Chiyoda-ku, Tokyo (JP)

(72) Inventors: Yasushi Hayasaka, Tokyo (JP); Masanori Matsumoto, Tokyo (JP); Yasunori Otsuki, Tokyo (JP); Tetsuo Fujigaki, Tokyo (JP); Yoshihiro Yasui, Tokyo (JP); Motonobu Iizuka, Tokyo (JP); Masaaki Endou, Tokyo (JP); Atsushi Fukunaga, Tokyo (JP); Takeshi Nakayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 326 days.

(21) Appl. No.: 14/754,821

(22) Filed: Jun. 30, 2015

(65) Prior Publication Data

US 2016/0043603 A1    Feb. 11, 2016

(30) Foreign Application Priority Data

Aug. 8, 2014    (JP) .................................. 2014-162022

(51) Int. Cl.
*H02K 3/28* (2006.01)
*H02K 15/00* (2006.01)
*H02K 15/10* (2006.01)
*H02K 3/51* (2006.01)
*H02K 13/00* (2006.01)

(52) U.S. Cl.
CPC ........... *H02K 3/51* (2013.01); *H02K 15/0062* (2013.01); *H02K 15/10* (2013.01); *H02K 13/003* (2013.01)

(58) Field of Classification Search
CPC ...... H02K 3/28; H02K 15/10; H02K 15/0062; H02K 13/003
USPC .......................................... 310/71, 232, 233
IPC ................................... H02K 3/28,15/00, 15/10
See application file for complete search history.

(56) References Cited

U.S. PATENT DOCUMENTS

| | | | | |
|---|---|---|---|---|
| 5,352,948 | A * | 10/1994 | Kirn ........................ | H02K 3/487 310/198 |
| 2001/0024073 | A1* | 9/2001 | Kliman .................. | H02K 13/00 310/219 |
| 2006/0001327 | A1 | 1/2006 | Ossenkopp et al. | |
| 2013/0328425 | A1* | 12/2013 | Tomita ............... | H02K 11/0094 310/71 |
| 2016/0043603 | A1* | 2/2016 | Hayasaka ................ | H02K 3/51 310/71 |

FOREIGN PATENT DOCUMENTS

| | | |
|---|---|---|
| DE | 38 42 074 A1 | 6/1990 |
| JP | 51-121701 U | 10/1976 |
| JP | 63-249440 A | 10/1988 |

OTHER PUBLICATIONS

Canadian Office Action issued in counterpart Canadian Application No. 2,893,978 dated May 2, 2016 (Four (4) pages).

(Continued)

*Primary Examiner* — John K Kim
(74) *Attorney, Agent, or Firm* — Crowell & Moring LLP

(57) ABSTRACT

A rotating electrical machine includes a rotor core, a rotor shaft, a coil, a bind, a lead-out wire of which one end is connected to the coil and the other end is connected to a neutral ring. A filling is filled between the coil and the neutral ring. The neutral ring is formed with a plurality of members that are connected with one another to have flexibility.

3 Claims, 6 Drawing Sheets

(56) References Cited

OTHER PUBLICATIONS

Canadian Office Action issued in counterpart Canadian Application No. 2,893,978 dated Mar. 2, 2017 (Three (3) pages).

* cited by examiner

NEUTRAL RING FOR USE IN ROTATING ELECTRICAL MACHINE AND METHOD FOR MANUFACTURING THE SAME

CROSS REFERENCE TO RELATED APPLICATION

This application claims the benefit of priority to Japanese Patent Application No. 2014-162022, filed on Aug. 8, 2014, the entire specification, claims and drawings of which are hereby incorporated by reference.

BACKGROUND OF THE INVENTION

Field of the Invention

The present invention relates to a neutral point (neutral ring) for use in a rotor of a rotating electrical machine and a method for manufacturing the same.

Description of the Related Arts

Field coils of a rotor of a rotating electrical machine using three-phase AC are arranged with a neutral point called as a neutral ring for shunting respective phase coils. In general, the neutral ring is a ring-shaped member made of metal such as copper and an aluminum alloy having a favorable electrical property of a resistance or the like, and connected to one ends of respective phase coils to constitute a star connection of three-phase coils.

When the rotor rotates, the neutral ring receives stress due to centrifugal force by rotation. In addition, junctions between the coils and the neutral ring also receive stress due to deformation of respective phase coils.

If the amplitude of fluctuations is large in rotation speed of the rotating electrical machine or fluctuations occur many times, the above-mentioned stress increases or the stress occurs many times. Accordingly, the neutral ring may suffer fatigue breakdown. Once the neutral ring suffers the fatigue breakdown, the rotor cannot generate a magnetic field and the rotating electrical machine loses its function. Consequently, it is essential to reduce the stress on the neutral ring for providing a rotating electrical machine having a long service life.

Techniques concerning a neutral ring have been described, for example, in Japanese Patent Application Publication No. S63-249440 and Japanese Utility Model Application Publication No. S51-121701. In the former reference, the neutral ring is arranged in the ring-shaped rigid body that is supported by and fixed to a rotor end plate at an end of the magnetic core of the rotor. In the latter reference, the neutral ring is embedded into and supported by a support of the coils of the rotor.

SUMMARY OF THE INVENTION

However, the techniques described in the above references employ the neutral ring that is a ring-shaped rigid body. When a deformation difference between the neutral ring and the coils due to centrifugal force caused by rotation of the rotor increases, the stress at the junctions between the neutral ring and the coils becomes larger, to cause fatigue damage to be accumulated in the junctions.

In an aspect of the invention, the present invention provides a neutral ring that reduces stress due to the deformation difference and prevents fatigue damage from being accumulated and a method of manufacturing the neutral ring in which a related neutral ring can be altered to the neutral ring of the present invention.

To solve the problem mentioned above, in the present invention, a neutral ring is not a rigid body in a ring shape but is formed with a plurality of arc-shaped members that are connected with one another to have a flexible structure so as to follow deformation of a coil. The neutral ring of the present invention is formed with the plurality of arc-shaped members that are connected with one another being overlapped in a circumferential direction to have less rigidity as compared with the ring shape.

Since the neutral ring having low rigidity can easily follow deformation of the coils due to centrifugal force, the junctions between the coils and the neutral ring do not receive large stress. As a result, the fatigue damage on the neutral ring can be reduced to allow for extending the service life of the neutral ring.

DETAILED DESCRIPTION OF THE PREFERRED EMBODIMENTS

An embodiment of the present invention will be described with reference to FIGS. 1 to 5.

Figure 1:
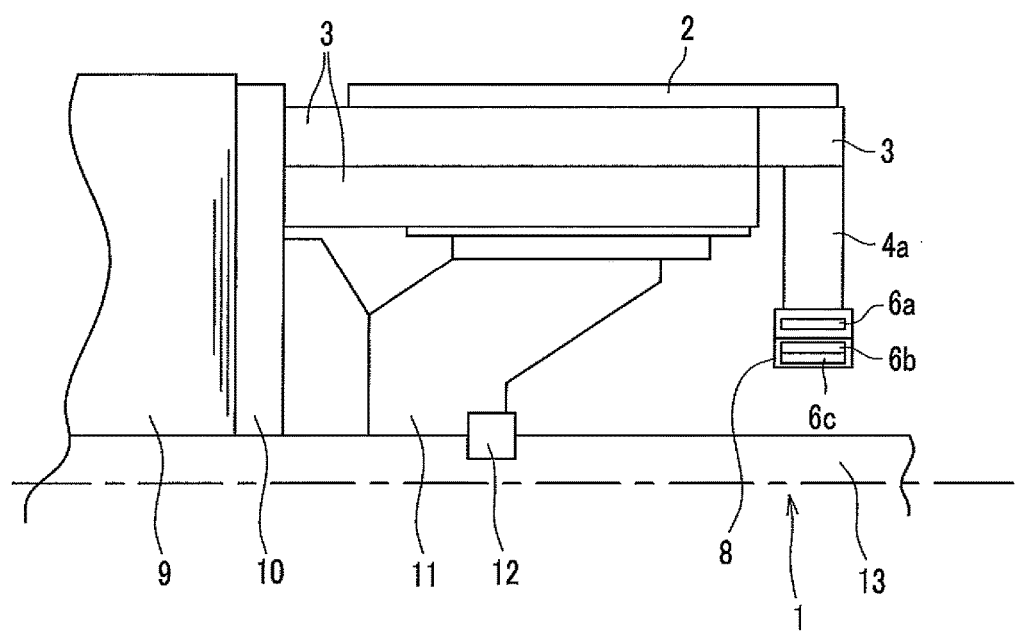
FIG. 1 is a longitudinal cross sectional view of an embodiment according to the present invention.
Figure 2:
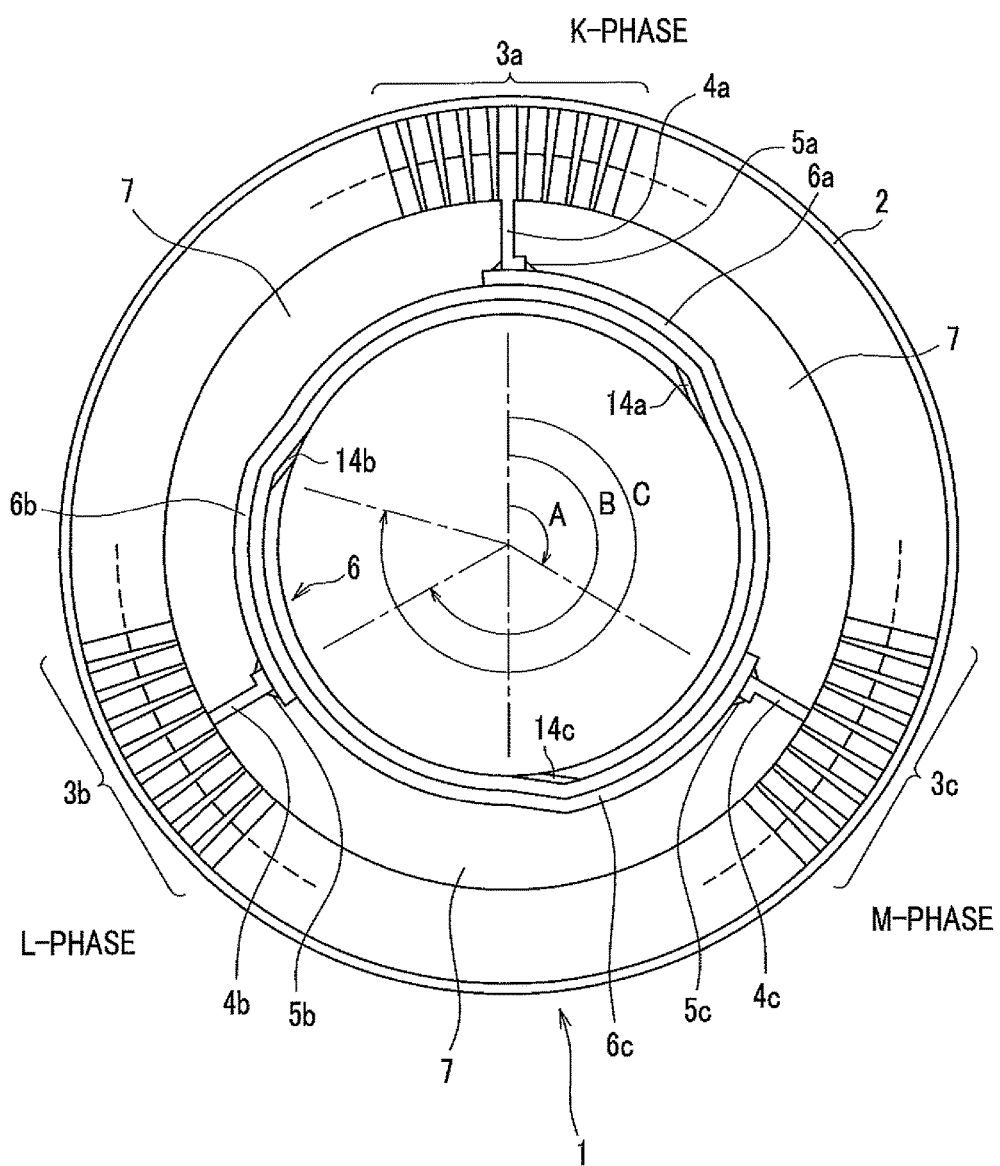
FIG. 2 is a cross sectional view as viewed from a direction of a rotor shaft of the embodiment according to the present invention.

FIG. 1 is a partial cross sectional view in which an upper half of a rotor 1 in a rotating electrical machine is cut out in an axis direction to show a main part of the present invention. FIG. 2 is a cross sectional view as viewed from the axis direction to show the main part of the rotor 1.

The rotor 1 includes: a rotor core 9; a core back 10 that fixes the rotor core 9 to a rotor shaft 13; a rotor clamp 11; a key 12; a coil 3 including a K-phase coil 3a, an L-phase coil 3b, an M-phase coil 3c that penetrates into the rotor core 9; a bind 2 that receives centrifugal force of the coil 3; and a K-phase lead-out wire 4a, an L-phase lead-out wire 4b, an M-phase lead-out wire 4c that are connected to the coil 3 (one end of each lead-out wire is connected to the coil 3 and the other end thereof is connected to a neutral ring 6 including neutral ring members 6a, 6b and 6c, to connect the coil 3 to the neutral ring 6). An insulator 7 made of glass cloth, mica, epoxy or the like is filled between the coil 3 and the neutral ring 6.

As shown in FIG. 2, the neutral ring members 6a, 6b and 6c are connected to the K-phase coil 3a, the L-phase coil 3b and the M-phase coil 3c of each phase, respectively. In a case where the rotor 1 is driven by three-phase AC or generates three-phase AC as the rotating electrical machine, the coils 3a, 3b, 3c for three phases are arranged to include certain angles in a rotation direction of the rotor 1 as the k-phase coil 3a, the L-phase coil 3b and the M-phase coil 3c.

A neutral point of the K-phase coil 3a is connected to the the K-phase neutral ring member 6a via the K-phase lead-out wire 4a with a K-phase brazing 5a or the like. The same applies to respective connections of the L-phase coil 3b and the M-phase coil 3c to the L-phase neutral ring member 6b and the M-phase neutral ring member 6c.

The neutral ring members 6a, 6b, 6c of respective phase are members obtained by forming elongated conductive plates having low resistance, such as copper and aluminum alloy in an arc shape. The arc-shaped neutral ring members 6a, 6b, 6c for respective phases are overlapped in a circumferential direction and connected at respective connection points 14a, 14b, 14c by brazing or the like. This forms the neutral ring 6 that serves as the neutral point for each phase coil.

The neutral ring members 6a, 6b, 6c for respective phases are arranged outermost at places where those are connected to the coils 3a, 3b, 3c for respective phases. As the neutral ring members 6a, 6b, 6c extend in the circumferential direction (clockwise direction in FIG. 2), respective neutral ring members are placed at more inner circumference sides. Then, at respective positions of the lead-out wires 4a, 4b, 4c for adjacent phases, respective neutral ring members are located at second inner positions from the outermost. If the respective neutral ring members 6a, 6b, 6c are long enough to pass through another lead-out wires 4a, 4b, 4c, respective neutral ring members are located at the third inner positions from the outermost.

In FIG. 2, the K-phase neutral ring member 6a has an arc shape. With the position of the K-phase lead-out wire 4a, which is a connection point with the K-phase coil 3a, being assumed as a starting point of the arc, the arc ending at an end of the K-phase neutral ring member 6a subtends a central angle C. With the same central angle definition, in a direction to which the K-phase neutral ring 6a extends, arcs ending at the M-phase lead-out wire 4c and the L-phase lead-out wire 4b subtend a central angle A and a central angle B, respectively.

The embodiment shown in FIG. 2 satisfies the formula 1 below.

$$C \geq B > A \quad \text{[formula 1]}$$

By satisfying the formula 1, the neutral ring members 6a, 6b, 6c are formed to be ring springs cut in part. Therefore, the neutral ring members 6a, 6b, 6c have low rigidity against a load in a radial direction to easily follow deformation of the coils 3a, 3b, 3c and the lead-out wires 4a, 4b, 4c in the radial direction. Thus, stress caused by the deformation of the coils 3a, 3b, 3c and the lead-out wires 4a, 4b, 4c in the radial direction which the neutral ring members 6a, 6b, 6c receive can be reduced. In addition, though being different from FIG. 2, a structure that satisfies the formula 2 below can obtain approximately the same effect.

$$B > C \geq A \quad \text{[formula 2]}$$

In this case, the neutral ring 6 is formed in double layers to allow for reducing a mass of the neutral ring 6.

The neutral ring members 6a, 6b, 6c may be formed in double layers or triple layers. At this time, each of the neutral ring members 6a, 6b, 6c is arranged as a single body entity with an insulator 8 such as a glass tape and a resin tape, and is connected to each of the connection points 14a, 14b, 14c by brazing or the like. Alternatively, each of the neutral ring members 6a, 6b, 6c may be not insulated as a single body entity but lashed with the glass tape for integration. In addition, overlapping portions of respective neutral ring members 6a, 6b, 6c may have resin to slide with each other.

In the same manner, the neutral ring members 6a, 6b, 6c may not be connected by brazing or the like at the connection points 14a, 14b, 14c, but may be contacted by lashing connection or by a structure such as a pin, a bolt or a dovetail groove with which the connection points and the neutral ring members can slide to each other.

Figure 3:
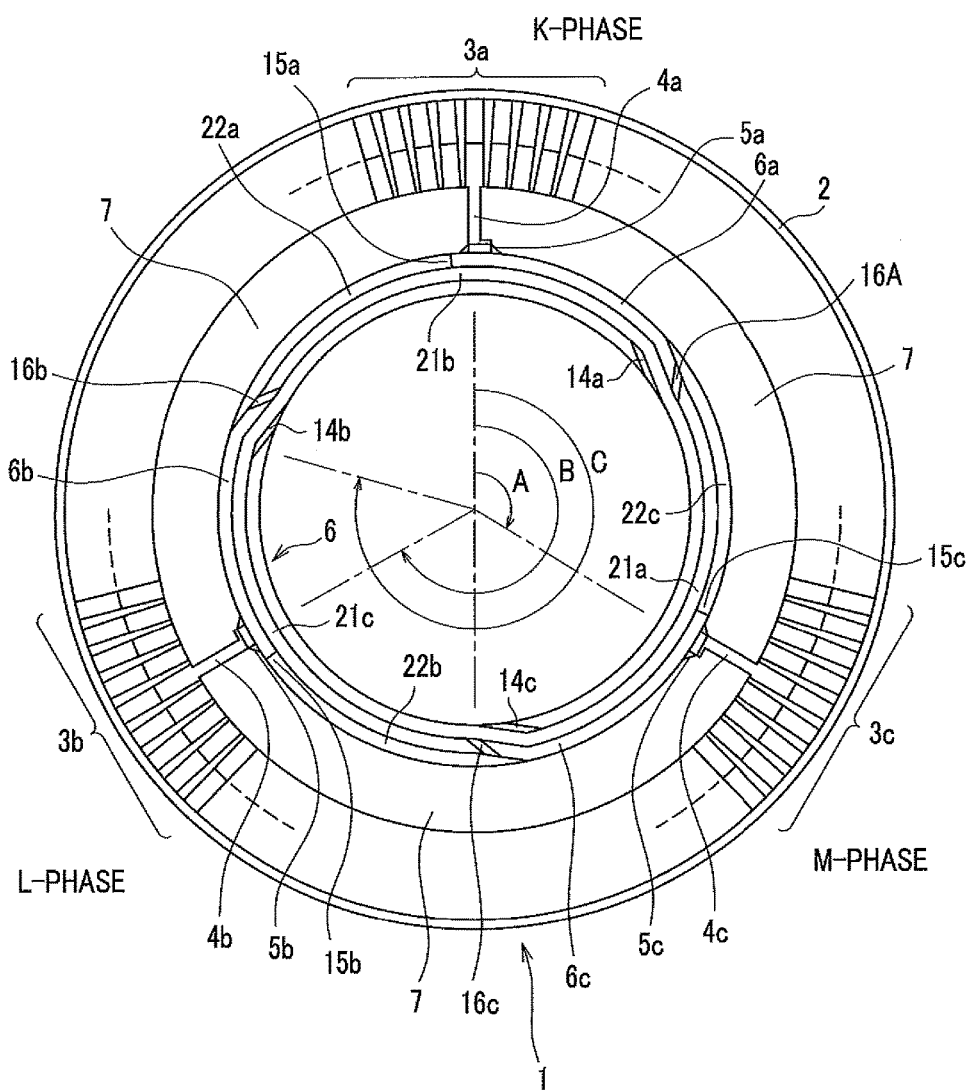
FIG. 3 is a cross sectional view as viewed from the direction of the rotor shaft of the embodiment according to the present invention.
Figure 4:
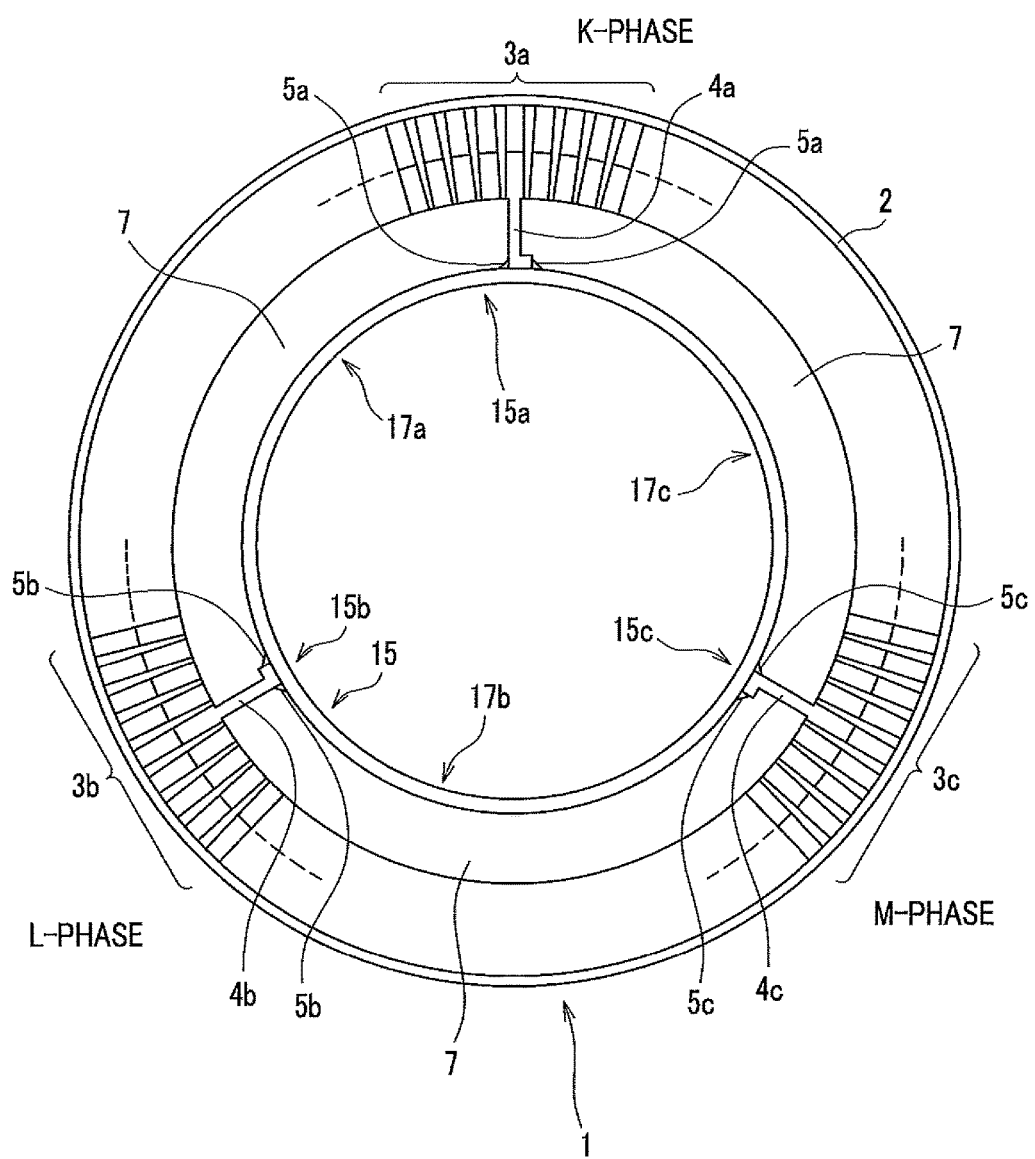
FIG. 4 is a cross sectional view of a neutral ring according to a related art.
Figure 5:
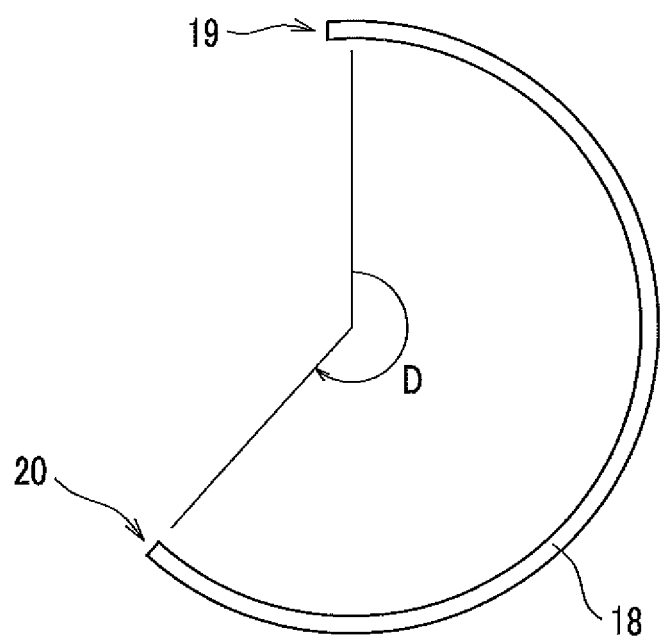
FIG. 5 is a view showing a member of the neutral ring according to the embodiment of the present invention.

Referring to FIGS. 3 and 4, a method of manufacturing the neutral ring members 6a, 6b, 6c (FIG. 3) in the embodiment of the present invention will be explained.

This method shows how the neutral ring members 6a, 6b, 6c shown in FIG. 3 are formed by altering the related neutral ring 15 (FIG. 4). FIG. 4 shows a neutral ring of a related art. In the related art, a neutral ring 15 has a ring shape. Other structures are approximately the same as those described in FIG. 2.

The K-phase neutral ring member 6a will be described as an example of alteration. At first, the neutral ring 15 is separated from the insulator 7. Since being adhered or lashed by the glass tape or the like to the insulator 7, the neutral ring 15 is separated by cutting off the glass tape or the like. At this time, the insulator 7 should not be broken, nor removed to a large extent.

Then, the neutral ring 15 is cut off in part from a cutting position 15a to a cutting position 17a. The cutting position 15a is around the brazing 5a between the lead-out wire 4a and the neutral ring 15 but does not affect the connection by the brazing 5a. In this example, the cutting position is located at the left side of the brazing 5a. The cutting position 17a is located between the K-phase and L-phase coils where jumper wires and/or lead wires to an outside of the rotor are not interrupted. Further, the cutting position 17a is located away from the L-phase coil to allow the neutral ring 15 to have sufficient flexibility after the neutral ring 15 is cut off. Cutting off the ring at a position to allow the ring to have flexibility facilitates connecting the neutral rings to be described later. In the same manner as the cutting positions for K-phase neutral ring, the respective cutting positions 15b, 17b, and cutting positions 15c, 17c of the L-phase and M-phase coils are positions offset from positions of the K-phase coil by amount of distance between respective two coils.

Next, new connection elements 18 of the neutral ring in an arc shape (FIG. 5) are connected at the cutting positions 17a, 17b, 17c of the neutral ring, respectively. In a case of the K-phase coil 3a, one end 19 of the connection element 18 is connected at the cutting position 17c by brazing or the like. A connection portion may be formed with a bevel to enhance strength. As a result of the connection, as shown in FIG. 3, the K-phase neutral ring member 6a is connected to the connection element 18 via the connection portion 16a to form a k-phase neutral ring 21a by the connection. The same applies to the connection elements 18 to the L-phase neutral ring member 6b and M-phase neutral ring member 6c. Thus, the L-phase neutral ring member 6b and M-phase neutral ring member 6b are connected to the connection elements 18 at connection portions 16b, 16c to form neutral rings 21b, 21c, respectively.

The K-phase neutral ring 21a is arranged along an inner circumference of the insulator 7, and is overlapped by the M-phase neutral ring member 6c around the lead-out wire 4c of the M-phase coil 3c. Accordingly, the K-phase neutral ring 21a is arranged at an inner circumference side of the M-phase neutral ring 21c that is formed with the connected M-phase neutral ring member 6c. The other end 20 of the connection element 18 (FIG. 5) forms the connection point 14a that is connected to the inner circumference side of the neutral ring 21c by brazing or the like. The same applies to the L-phase neutral ring 21b and M-phase neutral ring 21c that are connected to inner circumference sides of the K-phase neutral ring 21a and L-phase neutral ring 21b respectively via the connection elements 18 by the same method as the K-phase neutral ring 21a.

The cutting portions of the neutral ring for each phase, that is, the regions between the cutting positions 15a and 17a, between the cutting positions 15b and 17b, and between the cutting positions 15c and 17c, have gaps between the neutral rings 21a, 21b, 21c and the insulator 7 when the connection elements 18 are connected respectively as shown in FIG. 3. Therefore, insulators 22a, 22b, 22c having relatively high rigidity such as glass cloth, mica, epoxy or the like are filled in the gaps to prevent the neutral rings 21a, 21b, 21c from being deformed by centrifugal force caused by the rotation of the rotor.

In the present embodiment, the method shows how the neutral ring of the present invention can be formed from the related neutral ring. When the neutral ring is cut off to connect to the connection element, the length of the connection element is determined in consideration of rotor balance. In some cases, balance weights in consideration of the rotor balance may be placed in the regions where the insulators 22a, 22b, 22c are filled with.

Figure 6:
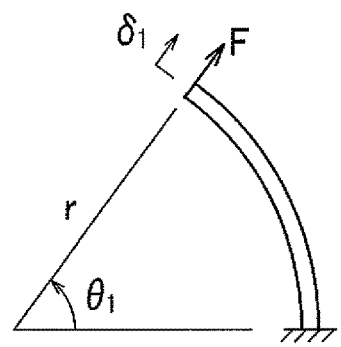
FIG. 6 is an explanatory view showing effects of the present invention.
Figure 7:
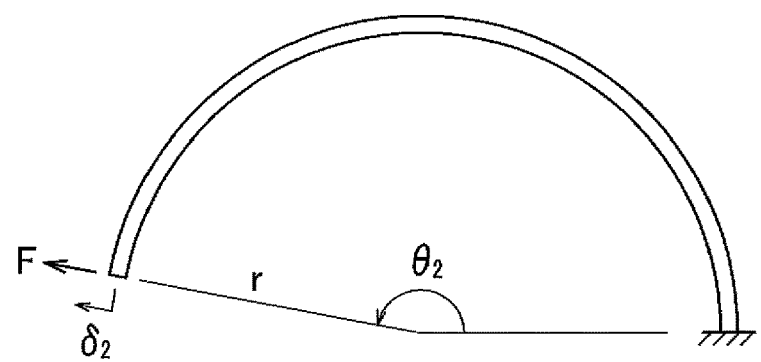
FIG. 7 is an explanatory view showing the effect of the present invention.

Finally, advantages of the present invention are described with reference to FIGS. 6 and 7. FIGS. 6 and 7 show displacements δ1, δ2 in the radial direction when arc-shaped members having central angles θ1, θ2 respectively are applied with external force F in the radial direction. When radii r of the members are the same, if $$\text{central angle } \eta 1 < \text{central angle } \theta 2 \qquad [\text{formula 3}]$$

is true, the following formula can be derived from calculations for beams.

$$\text{displacement } \delta 1 < \text{displacement } \delta 2 \qquad [\text{formula 4}]$$

Therefore, the neutral ring having a flexible structure can be obtained by overlapping a plurality of arc-shaped members.

What is claimed is:

1. A rotor for use in a rotating electrical machine, the rotor comprising:
   neutral ring;
   a rotor coil;
   a rotor core;
   a bind that receives centrifugal force of the rotor coil; and
   a lead-out wire that extends from the rotor coil and of which one end is connected to the rotor coil and the other end is connected to the neutral ring, wherein
      the neutral ring is formed by a plurality of members in an arc shape that are connected with one another,
      the neutral ring is configured to shunt the rotor coil in three phases,
      a filling is filled between the rotor coil and the neutral ring, and
      the plurality of members forming the neutral ring are overlapped with one another.

2. The rotor according to claim 1, wherein the neutral ring extends with respect to a rotation shaft of a rotor.

3. The rotor according to claim 1, wherein the neutral ring extends with respect to a rotation shaft of a rotor.

* * * * *